(12) United States Patent
Noguchi et al.

(10) Patent No.: US 10,119,582 B2
(45) Date of Patent: Nov. 6, 2018

(54) OPPOSED-PISTON TYPE DISK BRAKE DEVICE

(71) Applicant: AKEBONO BRAKE INDUSTRY CO., LTD., Tokyo (JP)

(72) Inventors: Tetsuya Noguchi, Tokyo (JP); Yoshio Totsuka, Tokyo (JP); Tomoki Yachi, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/129,952

(22) PCT Filed: Mar. 27, 2015

(86) PCT No.: PCT/JP2015/059723
§ 371 (c)(1),
(2) Date: Sep. 28, 2016

(87) PCT Pub. No.: WO2015/152074
PCT Pub. Date: Oct. 8, 2015

(65) Prior Publication Data
US 2017/0130788 A1 May 11, 2017

(30) Foreign Application Priority Data
Mar. 31, 2014 (JP) ................. 2014-070987

(51) Int. Cl.
*F16D 55/228* (2006.01)
*F16D 55/226* (2006.01)
(Continued)

(52) U.S. Cl.
CPC ......... *F16D 55/228* (2013.01); *F16D 55/226* (2013.01); *F16D 2121/04* (2013.01);
(Continued)

(58) Field of Classification Search
CPC ...... F16D 65/18; F16D 2121/24; F16D 55/226
(Continued)

(56) References Cited

U.S. PATENT DOCUMENTS 3,321,049 A * 5/1967 Swift ...................... F16D 55/22
188/71.9
5,769,189 A * 6/1998 Heibel .................. B60T 11/046
188/106 P
(Continued)

FOREIGN PATENT DOCUMENTS

CN Y-2690660 4/2005
JP H09-60667 A 3/1997
(Continued)

OTHER PUBLICATIONS

Extended European Search Report dated Oct. 24, 2017 in corresponding European patent application 15773913.7 (9 pages).

*Primary Examiner* — Bradley T King
*Assistant Examiner* — Mahbubur Rashid
(74) *Attorney, Agent, or Firm* — Drinker Biddle & Reath LLP

(57) ABSTRACT

A parking mechanism part (12) including a clamp member (39) and a thrust generation mechanism (40) is integrally arranged in a caliper (8) constituting an opposed-piston type disk brake (2a). The clamp member (39) is supported on the caliper (8) to be movable along the axial direction with respect to an inner body part (14) of the caliper (8), a spindle (45) of the thrust generation mechanism (40) is rotatably supported on the base part (42) of the clamp member (39), a nut (46) threadedly engaged with the tip end of the spindle (45) is arranged inside a combined-use piston (10) fitted in an enter-side inner cylinder (18b).

5 Claims, 15 Drawing Sheets

(51) Int. Cl.
   *F16D 121/04* (2012.01)
   *F16D 121/24* (2012.01)
   *F16D 125/36* (2012.01)
   *F16D 121/14* (2012.01)
   *F16D 125/40* (2012.01)

(52) U.S. Cl.
   CPC ...... *F16D 2121/14* (2013.01); *F16D 2121/24* (2013.01); *F16D 2125/36* (2013.01); *F16D 2125/40* (2013.01); *F16D 2200/003* (2013.01)

(58) Field of Classification Search
   USPC ........................................................ 188/72.3
   See application file for complete search history.

(56) References Cited

U.S. PATENT DOCUMENTS

| | | | |
|---|---|---|---|
| 6,382,368 | B2 | 5/2002 | Iwata et al. |
| 8,544,613 | B2 * | 10/2013 | Cantoni ............... F16D 55/2262 188/73.31 |
| 2002/0003067 | A1 | 1/2002 | Iwata et al. |
| 2002/0007989 | A1 * | 1/2002 | Matsuishi ............... B60T 1/065 188/73.39 |
| 2007/0068746 | A1 * | 3/2007 | Chittka .................... F16D 65/18 188/72.6 |
| 2008/0283345 | A1 * | 11/2008 | Balz ......................... F16D 65/18 188/72.6 |
| 2010/0032250 | A1 * | 2/2010 | Cantoni ............... F16D 55/2262 188/72.3 |
| 2012/0292141 | A1 | 11/2012 | Takahashi |
| 2015/0021125 | A1 * | 1/2015 | Nessi .................... F16D 55/228 188/72.5 |
| 2015/0219171 | A1 | 8/2015 | Kawamata et al. |

FOREIGN PATENT DOCUMENTS

| | | | | |
|---|---|---|---|---|
| JP | 2002-021892 | A | 1/2002 | |
| JP | 2007-177995 | A | 7/2007 | |
| JP | 2011-158058 | A | 8/2011 | |
| JP | 2012-246988 | A | 12/2012 | |
| JP | WO 2015098781 | A1 * | 7/2015 | ............ F16D 55/226 |
| JP | WO 2015174434 | A1 * | 11/2015 | ............ F16D 55/226 |
| WO | WO-A1-2007-039922 | | 4/2007 | |
| WO | WO-2014/024313 | A1 | 2/2014 | |

* cited by examiner

OPPOSED-PISTON TYPE DISK BRAKE DEVICE

TECHNICAL FIELD

The invention relates to an opposed-piston type disk brake device.

BACKGROUND ART

In some cases, as a brake device for service brake, there is employed a disk brake device not only in the front wheel of an automobile but also in the rear wheel thereof, because it is excellent in heat radiation and is capable of fine adjustment of a braking force during travelling. Also, in this case, a brake device for parking brake can be provided separately from the disk brake for service brake. Specifically, as disclosed, for example, in the patent documents 1 and 2, there is employed a structure (a drum-in-hat type structure) in which a drum brake device exclusively for parking brake is arranged inside a disk brake device exclusively for service brake; or, a structure (a twin-caliper type structure) in which a disk brake device exclusively for parking brake is arranged separately from a disk brake device exclusively for service brake.

FIG. 15 is a typical view of a conventional structure in which a disk brake device exclusively for service brake and a disk brake device exclusively for parking brake are provided separately. In this structure, in the periphery of a rotor 1 rotatable together with a wheel, there are arranged an opposed-piston type disk brake device 2 used for service brake and a floating type disk brake device 3 used for parking brake while they are spaced in the peripheral direction from each other. And, the two brake devices 2, 3 are respectively supported by and fixed to a knuckle 4 constituting a suspension device. Specifically, a caliper 5 constituting the opposed-piston type disk brake device 2 is supported on and fixed to a mounting part (stay) 6a provided on the knuckle 4 and a support 7 constituting the floating type disk brake device 3 is supported on and fixed to another mounting part 6b provided on the knuckle 4.

Here, terms "axial direction", "radial direction" and "peripheral direction" used in the specification and claims mean the "axial direction", "radial direction" and "peripheral direction" of the rotor.

In the above-structured conventional structure, the opposed-piston type disk brake device 2 exclusively for service brake and the floating type disk brake device 3 exclusively for parking brake are provided separately. Therefore, when the structure is regarded as a single brake device having two functions of service brake and parking brake, the whole apparatus is inevitably increased in size and weight. Also, since the knuckle 4 must include the mounting parts 6a, 6b respectively for supporting and fixing the brake devices 2, 3, the degree of freedom in the shape of the knuckle 4 is degraded. The knuckle 4 must further include a mounting part for fixing a damper, a mounting part for fixing a lower arm and so forth separately. Thus, to secure the degree of freedom in the shape of the knuckle is important in securing the degree of freedom in the design of members around the knuckle.

CITATION LIST

Patent Document

Patent document 1: JP H09-60667 A
Patent document 2: JP 2002-21892 A
Patent document 3: JP 2011-158058 A
Patent document 4: JP 2007-177995 A

SUMMARY OF INVENTION

Technical Problem

In view of the above circumstances, the invention has an object to realize two functions of service brake and parking brake by a single brake device, thereby reducing the size and weight of the apparatus and enhancing the degree of freedom in the shape of a suspension device.

Solution to Problems

The above object of the invention can be attained by the following structures.

(1) An opposed-piston type disk brake device, comprising:
a caliper including
an outer body part and an inner body part which are arranged across a rotor rotatable together with a wheel,
a pair of connecting parts connecting together peripheral-direction two ends of the outer body part and inner body part at a position existing more outward in a radial direction than an outer peripheral edge of the rotor, and
at least one set (two in total) of cylinders respectively arranged in the outer body part and inner body part to be opposed to each other, the caliper being fixed to a suspension device (a knuckle for example) while straddling over the rotor;
pistons respectively fitted in the cylinders to be liquid-tight and movable along the axial direction;
at least a pair of pads respectively arranged on opposite sides of the rotor and supported by the caliper to be movable along an axial direction with respect to the caliper; and
a parking mechanism part including
a clamp member including a pressure part in an outer side end thereof and a base part in an inner side end thereof, interposed between the connecting parts along a peripheral direction, supported by the caliper to be movable in the axial direction with respect to the caliper while straddling from outward in the radial direction over the pair of pads and the inner body part respectively intervening between the pressure part and the base part along the axial direction of the pads, and
a thrust generation mechanism including a member (a spindle for example) supported on the base part and movable toward the inner side with respect to the caliper in braking operation and a member (a nut for example) arranged in the inner body part and movable toward the outer side in braking operation,
wherein a braking force by a service brake is generated when pressure oil is supplied into the cylinders and the pads are pressed against opposite side surfaces of the rotor by the pistons, and
wherein a braking force by a parking brake is generated by that an inner side pad of a pair of the pads over which the clamp member straddles from outward in the radial direction is pressed against a side surface of the rotor directly or indirectly by the member movable toward the outer side, and an outer side pad of the pair of the pads is pressed by the pressure part against a side surface of the rotor when the clamp member is moved toward the inner side with respect to the caliper due to a reacting force caused by the pressing action of the inner side pad, in accordance with operation of the thrust generation mechanism.

(2) The opposed-piston type disk brake device according to the above (1), wherein the member moving toward the outer side presses an inner side piston of the pistons which is fitted in the same cylinder as the member moving toward the outer side.

(3) The opposed-piston type disk brake device according to the above (1) or (2), wherein the inner side piston fitted in the same cylinder as the member moving toward the outer side has a stepped shape including an outer side large diameter part, an inner side small diameter part and a step surface formed continuously with the large and small diameter parts, and wherein an area of the step surface is equal to a pressure receiving area of an outer side piston of the pistons which is arranged opposed in the axial direction to the inner side piston.

(4) The opposed-piston type disk brake device according to any one of the above (1) to (3), wherein the pressure part is arranged to straddle over the outer side piston.

(5) The opposed-piston type disk brake device according to any one of the above (1) to (4), wherein the thrust generation mechanism includes a spindle having a male screw part in an outer peripheral surface thereof and a nut having a female screw part in an inner peripheral surface thereof and screwed to the spindle.

(6) The opposed-piston type disk brake device according to any one of the above (1) to (5), wherein the thrust generation mechanism is operated by an electric motor.

Advantageous Effects of Invention

The above-structured opposed piston type disk brake device of the invention, singly, can fulfill two functions of service brake and parking brake. Therefore, when compared with a structure in which two exclusive apparatuses are arranged individually, the size and weight of the whole apparatus can be reduced and the degree of freedom in the shape of a suspension device can be enhanced.

That is, in the above (1) structure, the parking mechanism part functioning as parking brake is formed integrally in the opposed piston type disk brake device functioning as hydraulic service brake, thereby constituting a single opposed piston type disk brake device. Also, in the invention, of members constituting the parking mechanism part, the clamp member is supported on the caliper in such a manner that it is superimposed (mounted) on the caliper in the radial direction, and one (the member moving toward the outer side in braking operation) of the composing members of the thrust generation mechanism is arranged within the cylinder of the inner body part.

Therefore, when compared with a structure in which two apparatuses respectively exclusively for service brake and parking brake are arranged to be spaced in the peripheral direction from each other, a structure in which they are arranged simply continuously in the peripheral direction, such as the conventional structure shown in FIG. 15, the downsizing of the whole apparatus (particularly, when compared with the structure in which two apparatuses are arranged continuously in the peripheral direction, the reduction of the whole length along the peripheral direction) and weight reduction can be attained.

Further, since the suspension device needs only one mounting part for supporting and fixing the caliper, the degree of freedom in the shape of the suspension device can be enhanced.

Also, in the above (2) structure, in service brake and parking brake, by using a common piston (the inner side piston fitted in the same cylinder as the member moving toward the outer side), a braking force can be obtained. Also, this inner side piston can save working for passing it through the member moving toward the outer side.

Further, in the above (3) structure, pressing forces in service brake respectively produced by the inner side piston fitted in the same cylinder as the member moving toward the outer side and by the outer side piston opposed to the inner side piston in the axial direction can be set equal to each other.

Moreover, in the above (4) structure, the size of the opposed-piston type disk brake device along the peripheral direction can be reduced further.

DESCRIPTION OF EMBODIMENTS

First Embodiment

Figure 1:
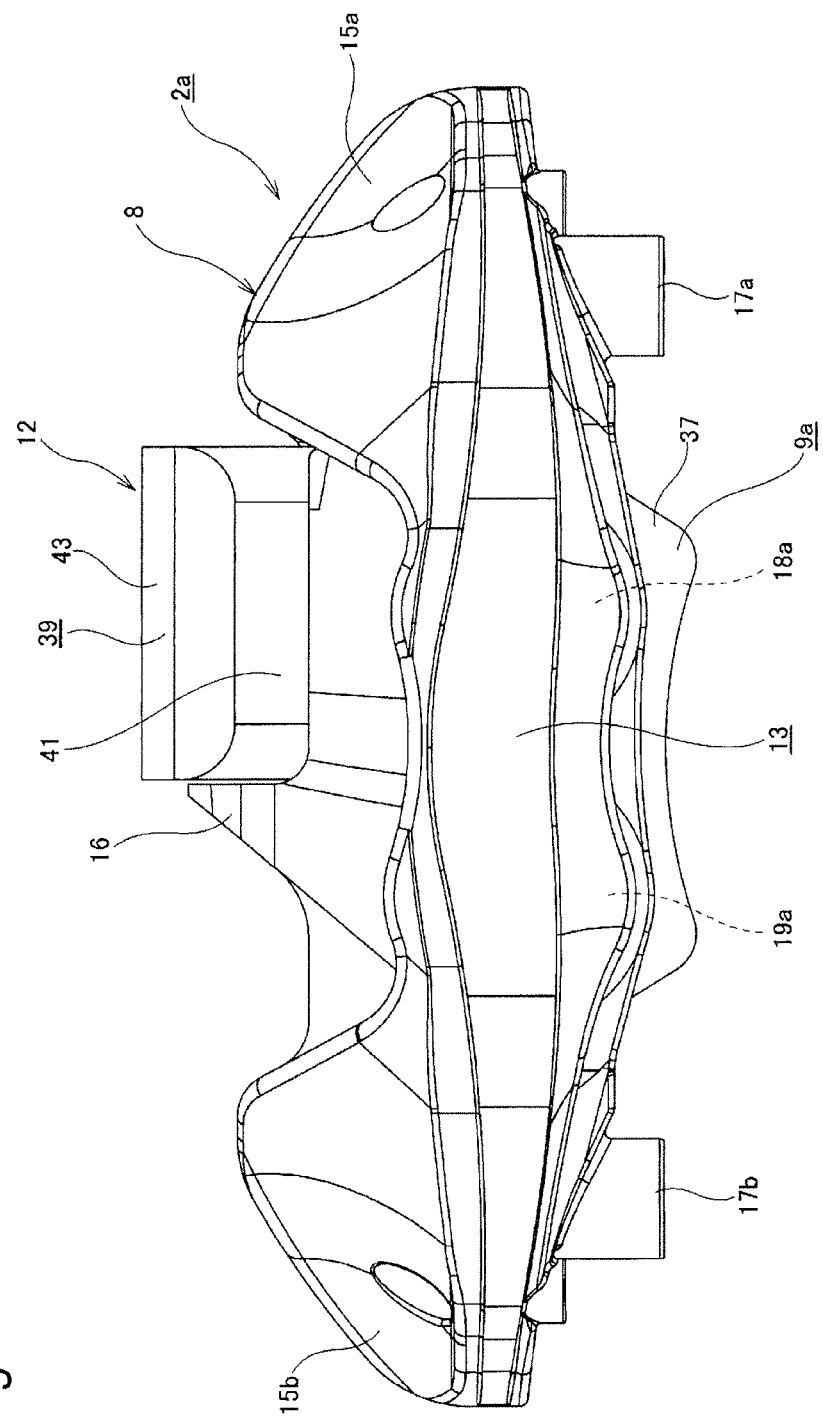
FIG. 1 is a front view of a disk brake device according to a first embodiment of the invention.

Description is given of a first embodiment of the invention with reference to FIGS. 1 to 12. An opposed-piston type disk brake device 2a of the first embodiment has two functions of service brake and parking brake. The opposed-piston type disk brake device 2a includes a caliper 8, a pair of pads 9a, 9b (outer pad 9a, inner pad 9b), a total of four pistons 10, 11 (a combined-use piston 10, three exclusively-for-service pistons 11), and a parking mechanism part 12.

Figure 2:
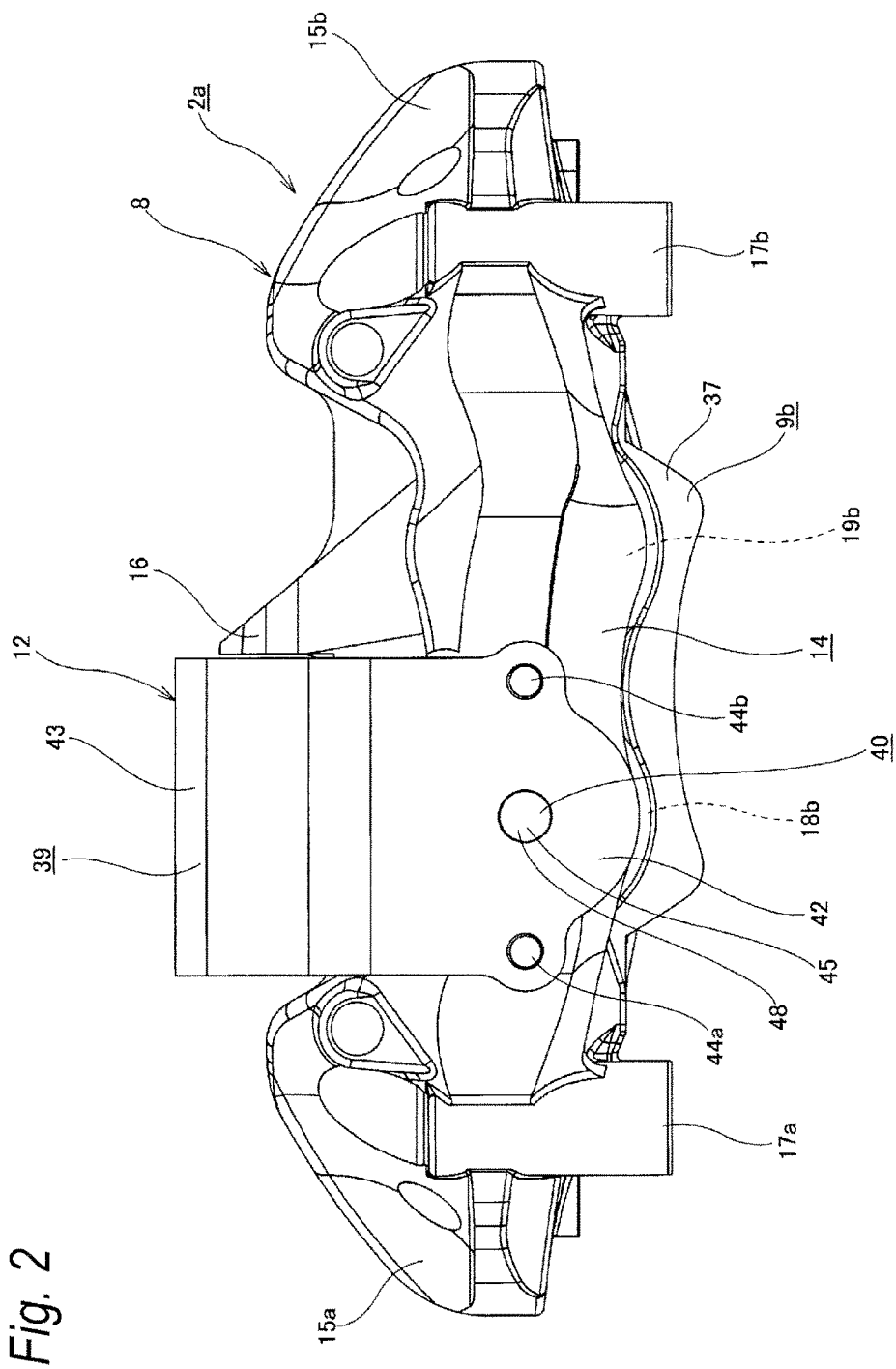
FIG. 2 is a back view of the disk brake device shown in FIG. 1.
Figure 3:
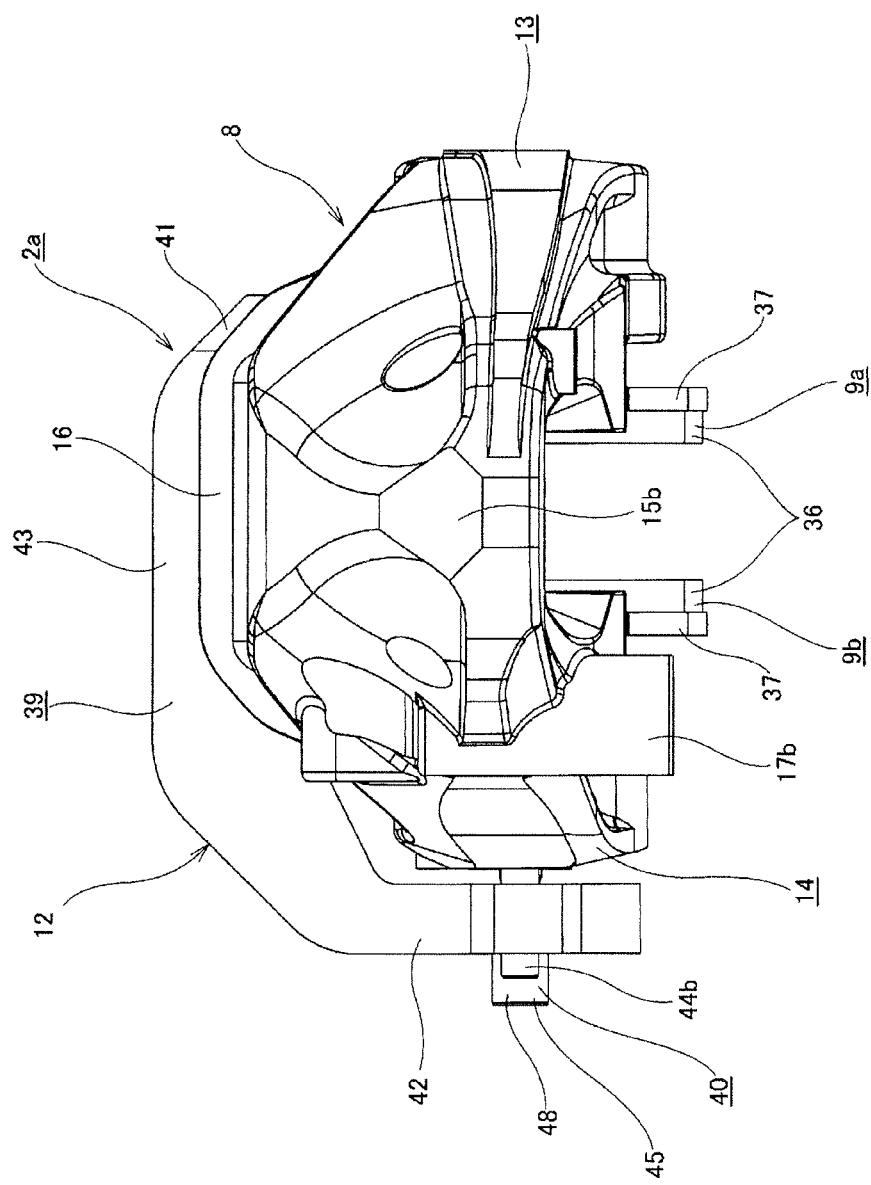
FIG. 3 is a left side view of the disk brake device shown in FIG. 1.
Figure 4:
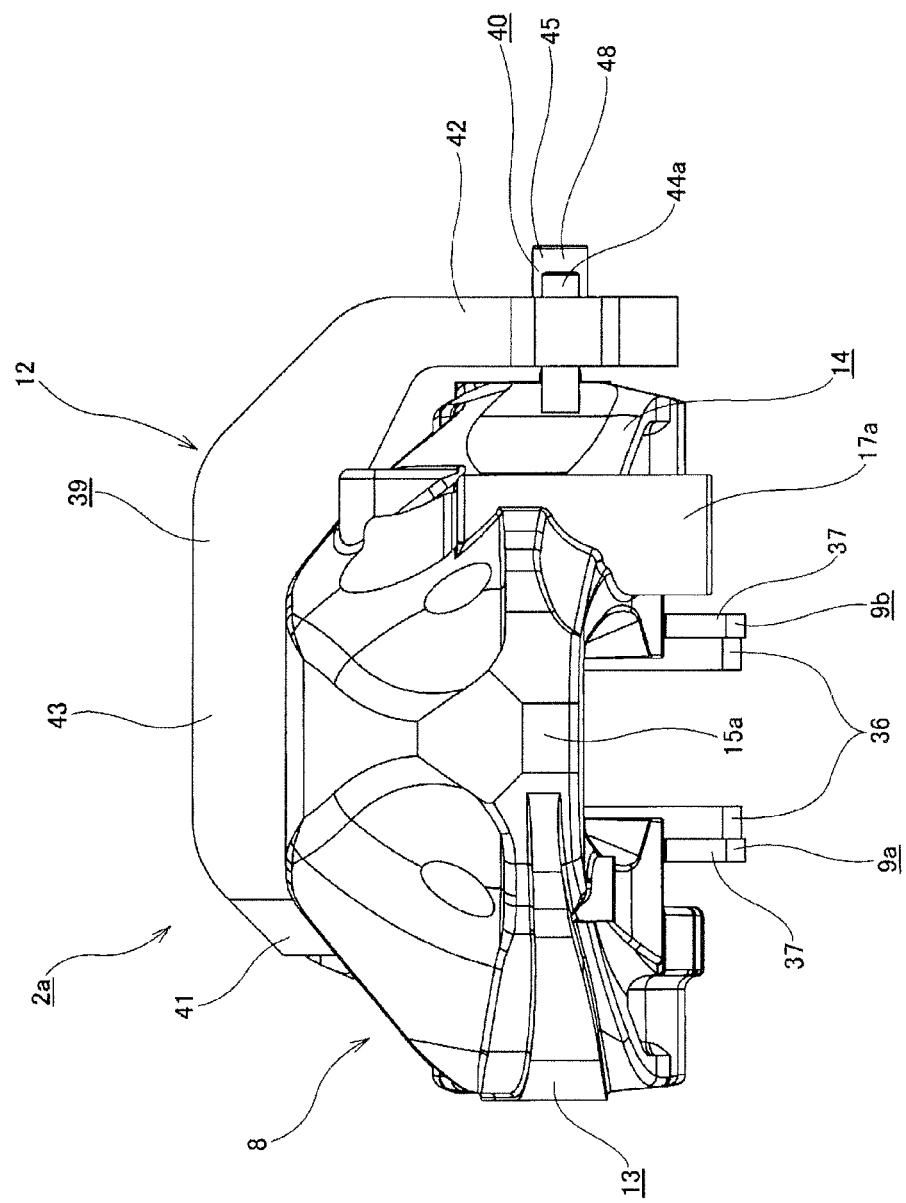
FIG. 4 is a right side view of the disk brake device shown in FIG. 1.
Figure 5:
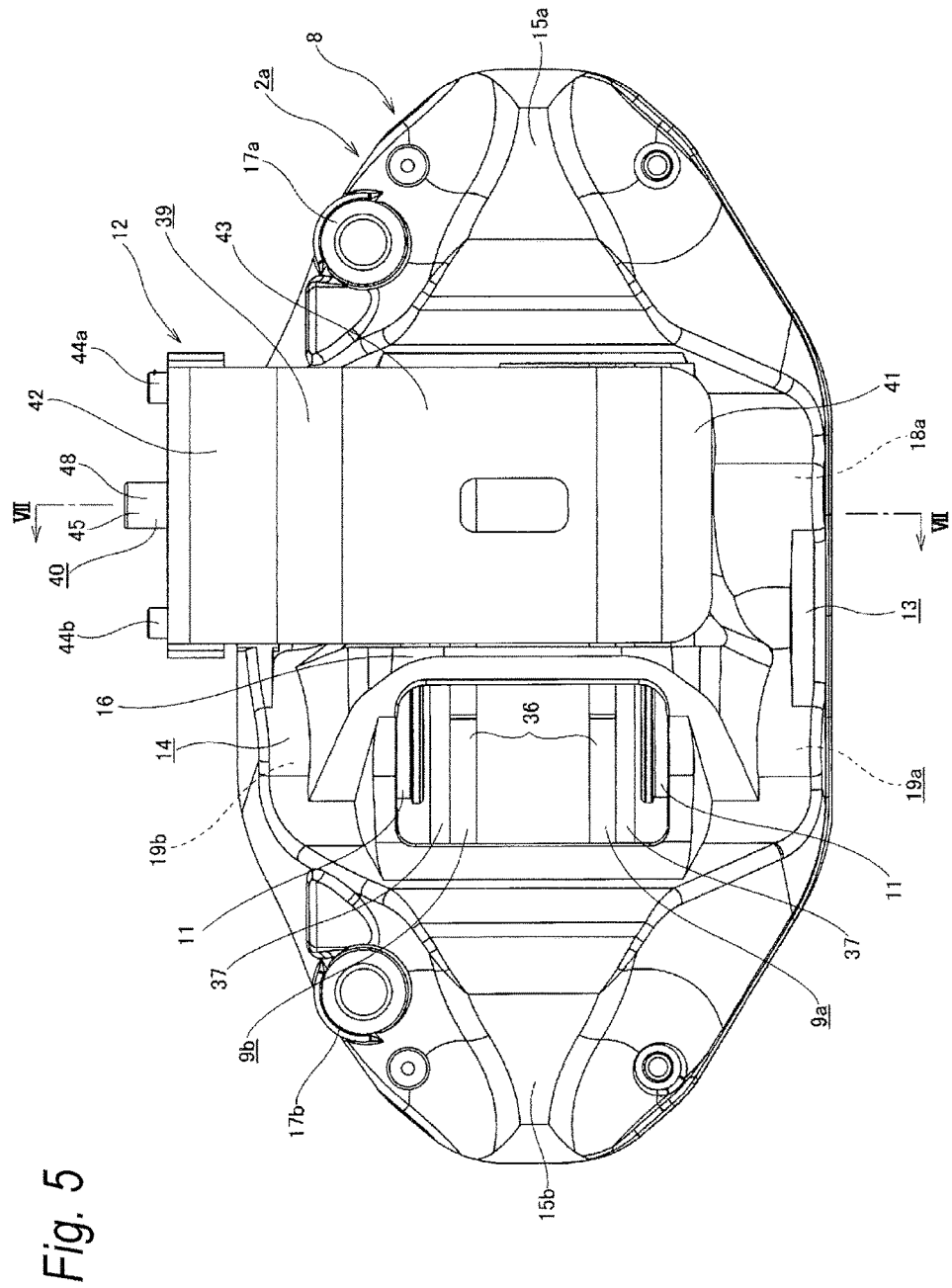
FIG. 5 is a plan view of the disk brake device shown in FIG. 1.
Figure 6:
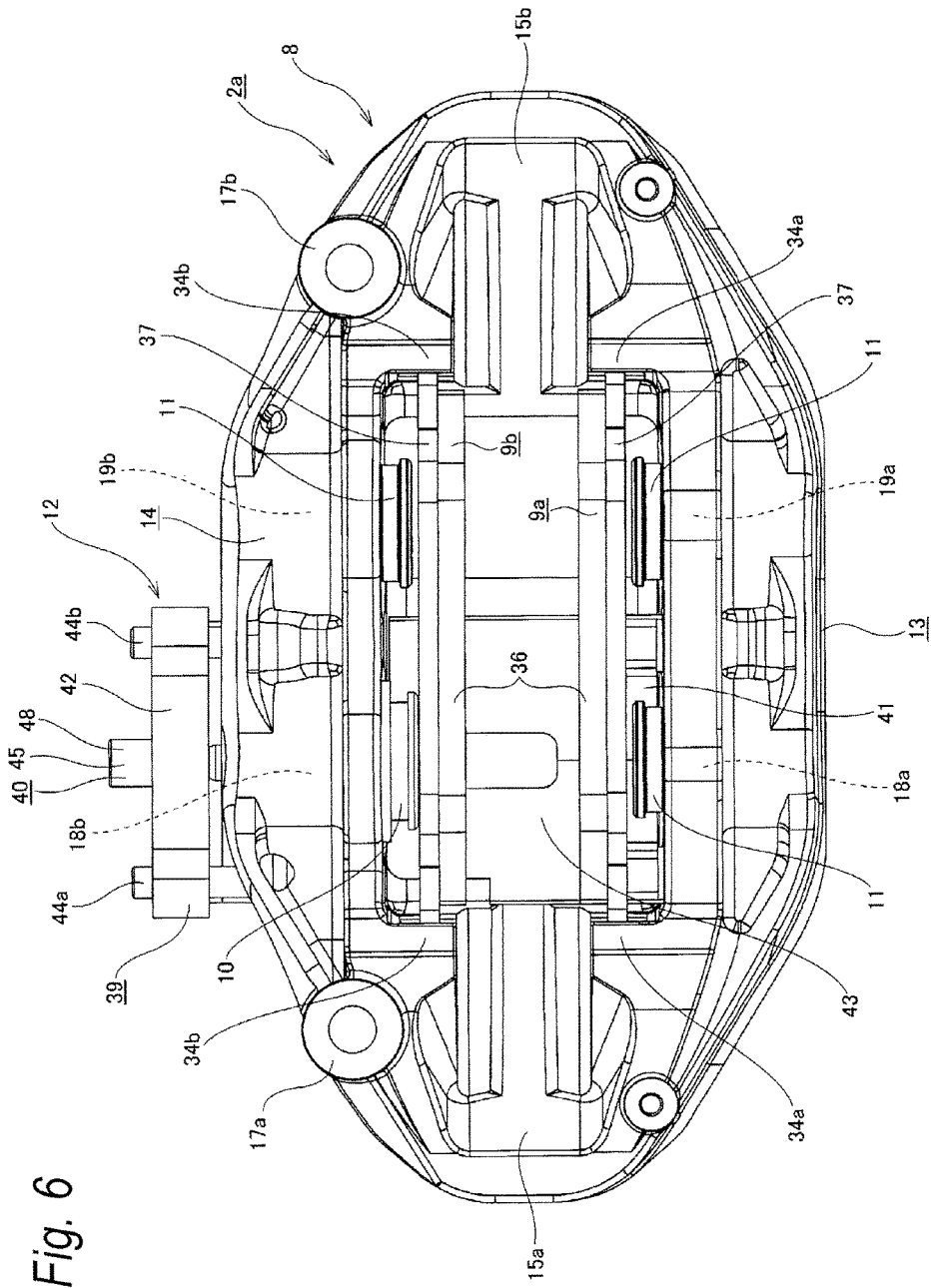
FIG. 6 is a bottom view of the disk brake device shown in FIG. 1.
Figure 7:
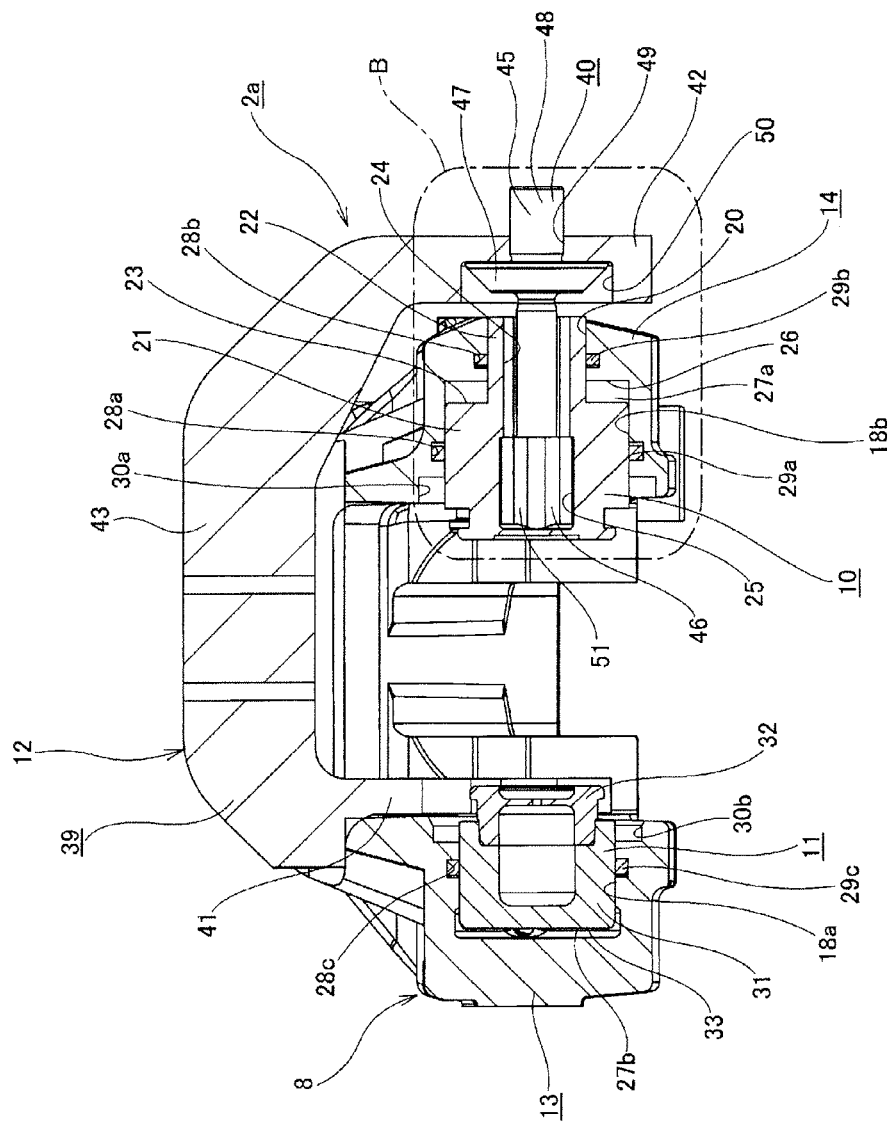
FIG. 7 is a section view taken along the VII-VII line of FIG. 5, with pads omitted.
Figure 8:
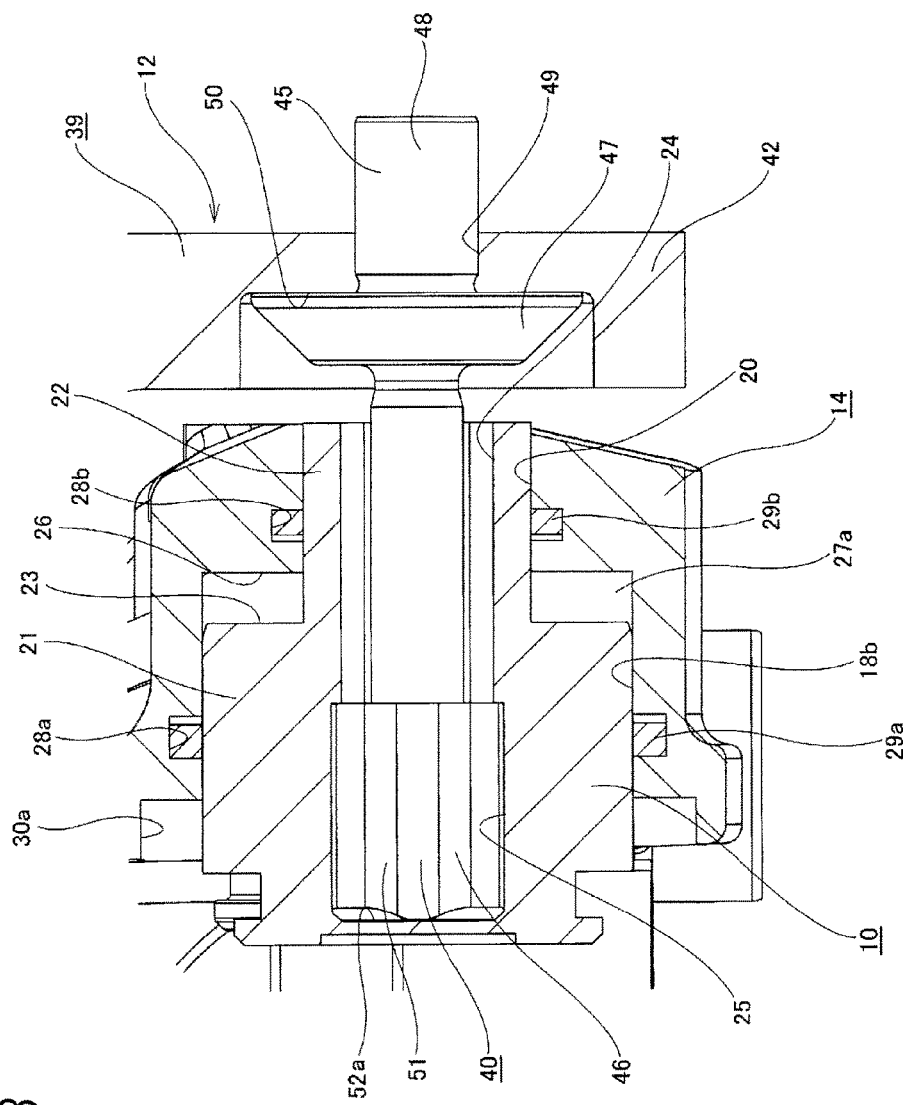
FIG. 8 is an enlarged view of the B block of FIG. 7.
Figure 9:
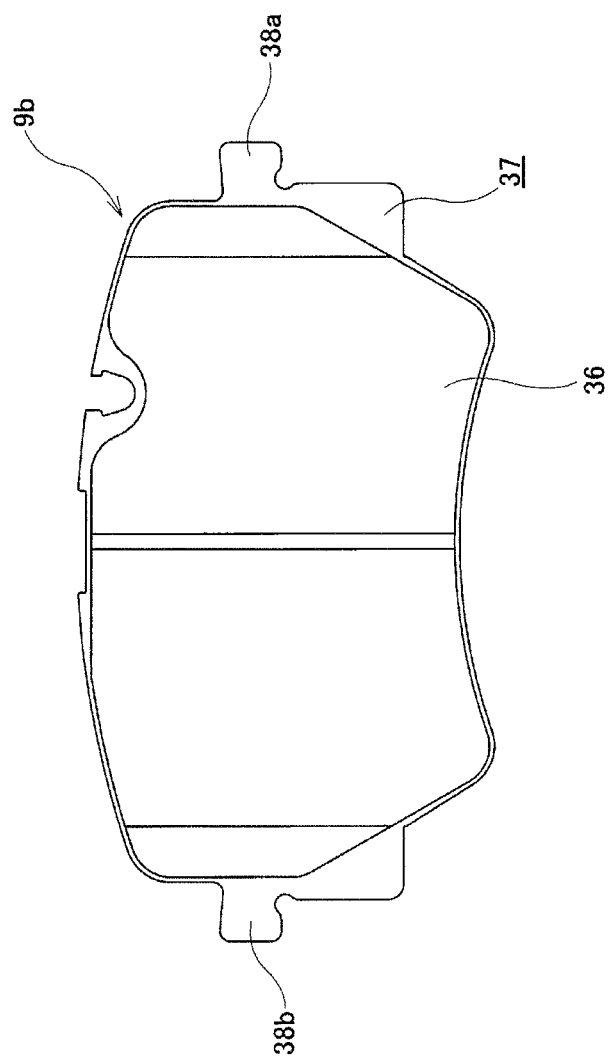
FIG. 9 is a front view of a pad (inner pad) taken from the disk brake device shown in FIG. 1.
Figure 10:
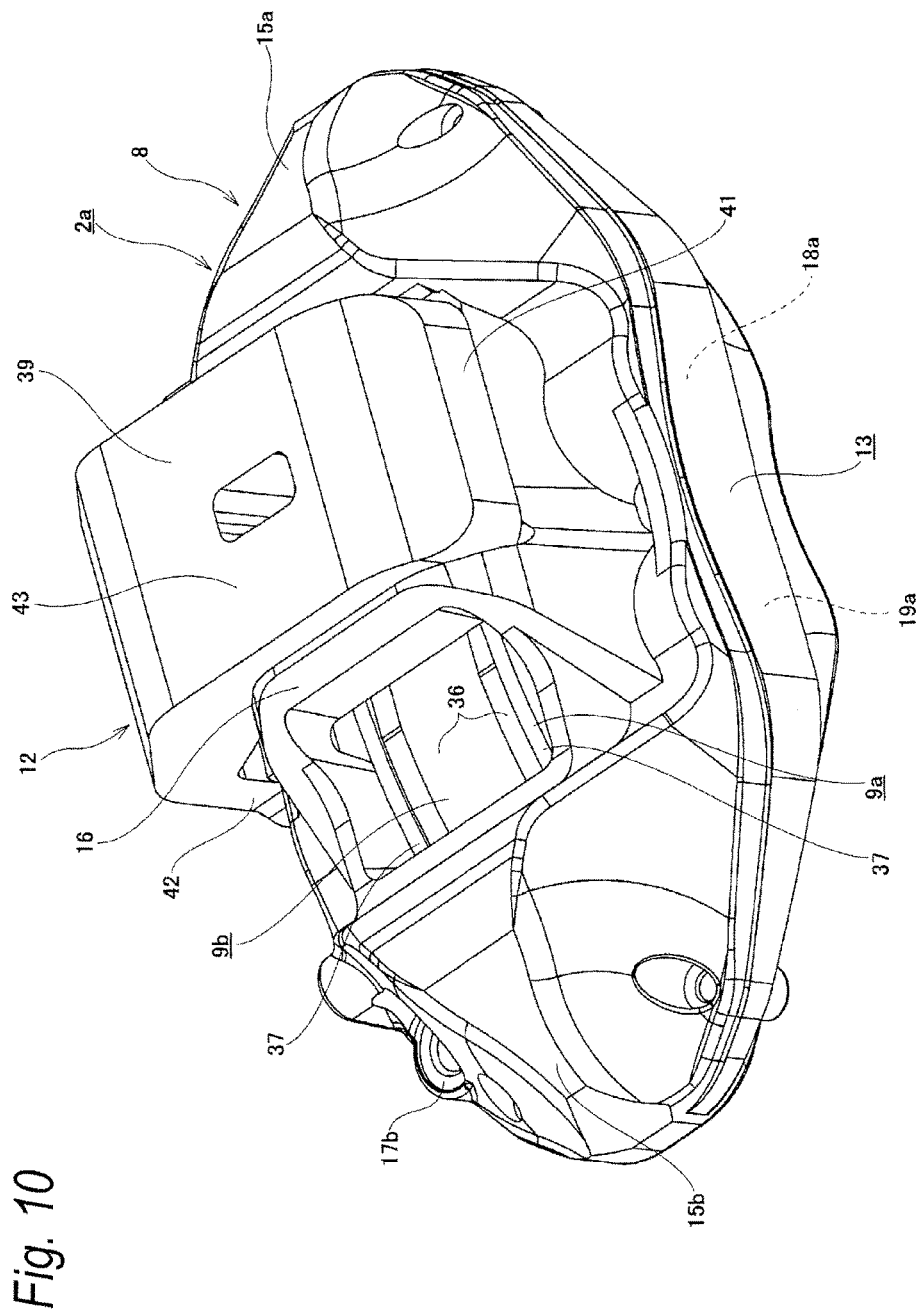
FIG. 10 is a perspective view of the disk brake device shown in FIG. 1 when viewed from outward in the radial direction and also from the outer side thereof.
Figure 11:
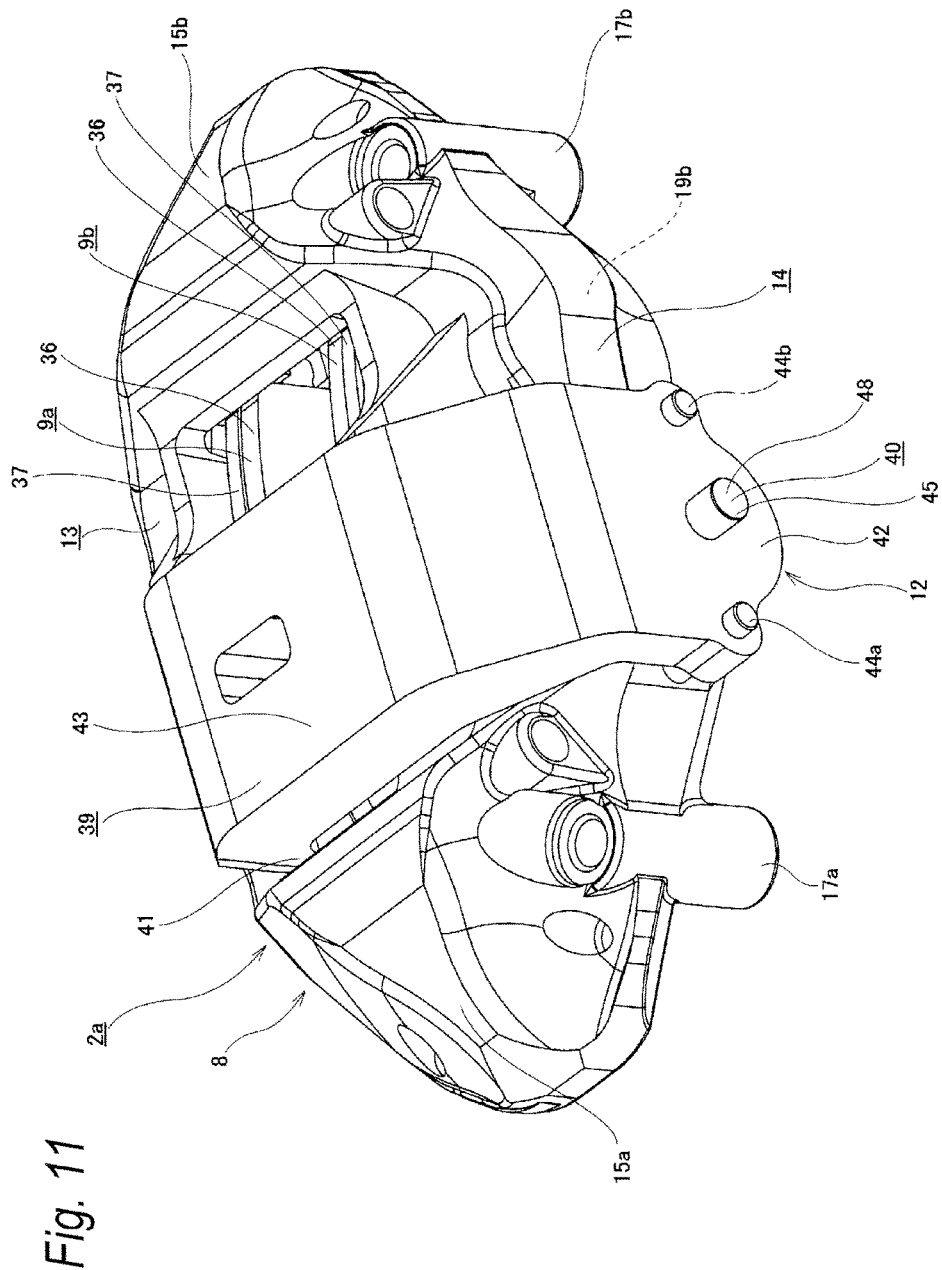
FIG. 11 is a perspective view of the disk brake device shown in FIG. 1 when viewed from outward in the radial direction and also from the inner side thereof.
Figure 12:
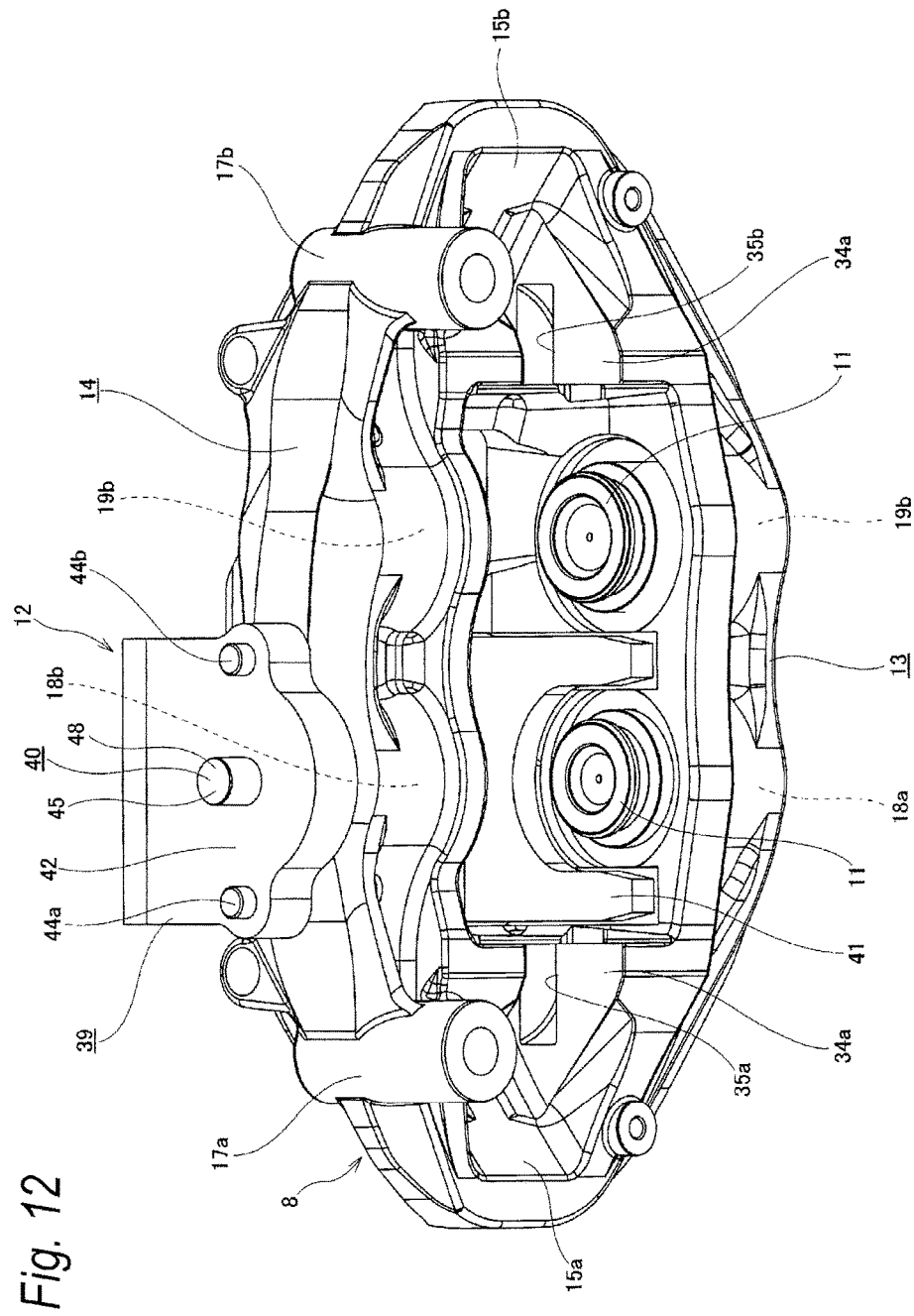
FIG. 12 is a perspective view of the disk brake device shown in FIG. 1 when viewed from outward in the radial direction and also from the inner side thereof, with pads omitted.

The caliper 8 supports the outer pad 9a and inner pad 9b to be movable in the axial direction (front and back directions in FIGS. 1, 2; left and right directions in FIGS. 3, 4; vertical direction in FIGS. 5, 6). The caliper 8 is made by casting (including die casting) light metal alloy such as aluminum alloy. The caliper 8 includes an outer body part 13 and an inner body part 14 formed to sandwich the rotor 1 (see FIG. 15) between them, and connecting parts 15a, 15b respectively for connecting the peripheral-direction one-side (right side in FIGS. 1, 5; left side in FIGS. 2, 6; enter-side in the vehicle advancing time) ends of the outer and inner body parts 13 and 14 to the peripheral-direction the other-side (left side in FIGS. 1, 5; right side in FIGS. 2, 6; exit-side in the vehicle advancing time) ends thereof. Also, the peripheral-direction middle sections of the outer and inner body parts 13 and 14 are connected to each other by a middle connecting part 16. The caliper 8 is supported on and fixed to a mounting part constituting the knuckle 4 (see FIG. 15) by a pair of mounting seats 17a, 17b provided on the inner body part 14.

Inside the peripheral-direction one-side sections of the outer and inner body parts 13 and 14, there are arranged an enter-side outer cylinder 18a and an enter-side inner cylinder 18b which are opposed to each other and, inside the peripheral-direction other-side sections thereof, there are arranged an exit-side outer cylinder 19a and an exit-side inner cylinder 19b while they are opposed to each other. In other words, in the outer body part 13, the enter-side outer cylinder 18a and exit-side outer cylinder 19a are arranged while they are spaced in the peripheral direction from each other; and, in the inner body part 14, the enter-side inner cylinder 18b and exit-side inner cylinder 19b are arranged while they are spaced in the peripheral direction from each other. Also, in such section of the inner body part 14 as matches the enter-side inner cylinder 18b, there is formed a communication hole 20 (opened in the bottom surface 26) communicating with the enter-side inner cylinder 18b. Of a total of four cylinders 18a, 18b, 19a, 19b which are arranged as one or more sets, inside the enter-side inner cylinder 18b, there is fitted a combined-use piston 10 to be used for both service brake and parking brake and, inside the remaining three cylinders 18a, 19a and 19b, there are fitted exclusively-for-service pistons 11 to be used only for service brake, in such a manner that they are oil tight and are movable along the axial direction.

The combined-use piston 10 fitted in the enter-side inner cylinder 18b is made of aluminum alloy, includes an outer side large diameter part 21, an inner side small diameter part 22 and a circular step surface 23 formed continuously with the large and small diameter parts 21 and 22, while the piston 11 has a bottomed cylindrical shape with a stepped-shaped outer peripheral surface. Also, in the inside of the combined-use piston 10, there is formed a storage hole 24 opened only on the inner side in order to arrange part of the composing members of a thrust generation mechanism 40 (to be discussed later). In the outer side half part of the storage hole 24, there is formed a female spline section 25.

In the thus structured combined-use piston 10, while the large diameter part 21 is fitted in the enter-side inner cylinder 18b, the small diameter part 22 is inserted into the communication hole 20 with no play and the step surface 23 is opposed to the bottom surface 26 of the enter-side inner cylinder 18b in the axial direction. And, between the step surface 23, bottom surface 26, the inner peripheral surface of the enter-side inner cylinder 18b and the outer peripheral surface of the small diameter part 22, there is formed a circular liquid pressure chamber 27a for introduction of pressure oil. In the axial-direction middle inner peripheral surface of the enter-side inner cylinder 18b and in the axial-direction middle inner peripheral surface of the communication hole 20, there are formed rectangular-section seal grooves 28a, 28b respectively. And, annular piston seals 29a, 29b are respectively mounted in the seal grooves 28a, 28b. Also, in the outer side opening (outer side end) of the inner peripheral surface of the enter-side inner cylinder 18b, there is formed a large diameter groove 30a having an enlarged inside diameter dimension. And, a dust cover (not shown) is mounted into the large diameter groove 30a.

Meanwhile, the exclusively-for-service pistons 11 fitted in the remaining three cylinders 18a, 19a and 19b are made of aluminum alloy, and each includes a bottomed cylinder-shaped piston main body 31 and pressure part 32 fixed to the tip end of the piston main body 31. Also, between the bottom surfaces 33 of the piston main bodies 31 and the deep parts (inner peripheral surfaces and bottom surfaces) of the cylinders 18a, 19a, 19b, there is formed a liquid pressure chamber 27b for introduction of pressure oil. In the axial-direction middle inner peripheral surfaces of the cylinders 18a, 19a, 19b, there are formed rectangular-section seal grooves 28c respectively. And, annular piston seals 29c are mounted in the seal grooves 28c respectively. In the openings of the inner peripheral surfaces of the cylinders 18a, 19a, 19b, there are formed large diameter grooves 30b each having an enlarged inside diameter dimension. And, dust covers (not shown) are mounted in the large diameter grooves 30b.

Also, a guide opening formed in the inner body part 14 enables introduction of pressure oil into the respective liquid pressure chambers 27a, 27b. Particularly, in the first embodiment, the area (pressure receiving area) of the circular step surface 23 constituting the combined-use piston 10 is equal to the area (pressure receiving area) of the bottom surface 33 of the exclusively-for-service piston 11, whereby, in service brake operation, the combined-use piston 10 and the exclusively-for-service piston 11 opposed to the combined-use piston 10 in the axial direction can press the side surface of the rotor 1 with equal pressing forces.

Also, on the peripheral-direction two ends of the mutually opposed side surfaces of the outer body part 13 and inner body part 14 (the inner side surface of the outer body part 13, the outer side surface of the inner body part 14), there are provided a pair of guide wall sections 34a, 34b respectively. And, in the radial-direction middle positions of the side surfaces mutually opposed in the peripheral direction of the two guide wall sections 34a, 34b, there are formed guide recessed grooves 35a, 35b respectively.

The outer pad 9a and inner pad 9b are constituted of linings (friction materials) 36 and metal-made back plates (pressure plates) 37 supporting the back surfaces of the linings 36. On the radial-direction middle sections of the side edges on the peripheral-direction two sides of the back plates 37, there are provided a pair of projection-shaped ear sections 38a, 38b respectively projecting on both sides in the peripheral direction. That is, the enter-side ear section 38a is arranged in the radial-direction middle portion of the enter-side side edge part of the back plate 37 to project toward the enter-side, while the exit-side ear section 38b is arranged in the radial-direction middle portion of the exit-side side edge part of the back plate 37 to project toward the exit-side. The two ear sections 38a, 38b are loosely engaged into the guide recessed grooves 35a, 35b respectively. Thus, the outer pad 9a and inner pad 9b are supported such that they can move along the axial direction but are prevented from moving along the peripheral direction and the radial direction with respect to the caliper 8.

The parking mechanism part 12 includes a clamp member 39 and a thrust generation mechanism 40. The clamp member 39 is arranged between the peripheral-direction one end side connecting part 15*a* and middle connecting part 16 in the peripheral direction such that it straddles over the outer pad 9*a*, inner pad 9*b* and inner body part 14 from outward in the radial direction. The clamp member 39 is made of aluminum-based alloy or iron-based alloy, has a substantially U-like shape as a whole, and includes a bifurcated pressure part 41, a base part 42 disposed in the inner-side end, and a bridge part 43 connecting the pressure part 41 and base part 42 to each other.

Also, in the first embodiment, in a state where the inner side surface of the pressure part 41 is opposed to the outer side surface of the peripheral-direction one side half part of the outer pad 9*a* and the outer side surface of the base part 42 is opposed to the inner side surface of the peripheral-direction one side half part of the inner body part 14, the above-structured clamp member 39 is supported to be movable in the axial direction with respect to the caliper 8.

Therefore, in the first embodiment, the outer side ends of a pair of guide pins (reverse pins) 44*a*, 44*b* are screwed to the peripheral-direction one side portion of the inner body part 14 constituting the caliper 8. And, while, of the two guide pins 44*a*, 44*b*, the middle sections of the parts projecting toward the inner side further than the inner body part 14 are used as sliding sections, the two pins are loosely inserted into a pair of guide holes formed in the base part 42 to be movable along the axial direction. Here, the peripheries of the two guide pins 44*a*, 44*b* can also be covered by a dustproof boot (not shown) made of elastic material.

The thrust generation mechanism 40 is a feed screw mechanism which converts rotation motion to linear motion, in operation, changes the whole length along the axial direction, and includes a spindle 45 and a nut 46. The spindle 45 corresponds to such member set forth in the claims as can move toward the inner side, and includes a male screw part in the outer peripheral surface of the tip end thereof and a flange part 47 formed in the portion near to the base end thereof to have a larger diameter than the remaining portions thereof. The base end 48 of the spindle 45 is rotatably supported within a support hole 49 formed in a base part 42 constituting the clamp member 39, while the tip end part and middle part thereof are inserted from the inner side into the storage hole 24 of the combined-use piston 10 fitted in the enter-side inner cylinder 18*b*. The inner side surface of the flange part 47 is contacted with the outer side surface of a circular storage recess 50 formed in the outer side surface of the base part 42.

Meanwhile, the nut 46 corresponds to such member set forth in the claims as can move toward the outer side, includes a female part in the inner peripheral surface thereof, and is screwed on the tip end part of the spindle 45. The outer peripheral surface of the nut 46 includes a male spline section 51. The spline section 51 is spline engaged with the female spline section 25 formed in the outer side half part inner peripheral surface of the storage hole 24. Thus, the nut 46 is arranged inside the combined-use piston 10 in such a manner that it can move in the axial direction but is prevented against rotation relative to the piston.

Also, in the first embodiment, an electric drive unit (MGU) (not shown) is supported on and fixed to the inner side surface of the base part 42. The electric drive unit includes a casing, and an electric motor and a reduction mechanism such as a geared reducer respectively stored within the casing. A final gear constituting the reduction mechanism is fixed to the base end 48 constituting the spindle 45. Thus, when the spindle 45 is rotated according to energization to the electric motor, the nut 46 is caused to move in the axial direction with respect to the caliper 8 (inner body part 14).

To operate service brake by the above structured opposed-piston type disk brake device 2*a* of the first embodiment, pressure oil is supplied into the liquid pressure chambers 27*a*, 27*b* of the respective cylinders 18*a*, 18*b*, 19*a* and 19*b*. Thus, the pistons 10, 11 (one combined-use piston 10 and three exclusively-for-service pistons 11) are pushed out from the cylinders 18*a*, 18*b*, 19*a* and 19*b* respectively, thereby pressing the outer pad 9*a* and inner pad 9*b* against the opposite side surfaces of the rotor 1. As a result, the rotor 1 is strongly pressed from both sides in the axial direction, thereby braking. Thus, in the first embodiment, a braking force by service brake is obtained by pushing out all pistons 10, 11 through introduction of oil pressure.

Meanwhile, to operate parking brake, on energization of the electric motor constituting the electric drive unit, the spindle 45 constituting the thrust generation mechanism 40 is rotated, thereby moving the nut 46 toward the outer side with respect to the inner body part 14. Thus, the tip end (outer side end) of the nut 46 is pressed against a receiving surface 52*a* formed in the inner side surface of the tip end of the combined-use piston 10, thereby enabling the combined-use piston 10 to press the inner pad 9*b* against the inner side surface of the rotor 1. Also, a reacting force caused by this pressing action is transmitted through the contact portion between the flange part 47 and storage recess 50 to the clamp member 39, whereby the clamp member 39 is moved toward the inner side with respect to the caliper 8 to allow the pressure part 41 to press the outer pad 9*a* against the outer side surface of the rotor 1. As a result, the rotor 1 is strongly pressed from both sides in the axial direction, thereby enforcing braking. Thus, in the first embodiment, a braking force by parking brake can be obtained only by driving the parking mechanism part 12 which performs such operation as the floating type brake.

Also, to remove the parking brake, the spindle 45 may be rotated by the electric motor reversely to the braking operation. Thus, the nut 46 is moved toward the inner side with respect to the inner body part 14. Also, the spindle 45 shifts toward the inner side with respect to the inner body part 14, whereby the clamp member 39 shifts toward the outer side with respect to the inner body part 14. Also, the combined-use piston 10 is moved toward the inner side (in a direction to move apart from the rotor 1) by the elastic restoring forces of the two piston seals 29*a*, 29*b*. As a result, clearances are secured between the outer pad 9*a*, inner pad 9*b* and the opposite side surfaces of the rotor 1.

According to the above structured opposed-piston type disk brake device of the first embodiment can singly fulfill two functions of service brake and parking brake and, therefore, when compared with a structure where two kinds of exclusive apparatuses are arranged, the size and weight of the whole apparatus can be reduced and the degree of freedom in the shape of the knuckle 4 can be enhanced.

That is, in the first embodiment, the parking mechanism part 12 functioning as parking brake is provided integrally in the opposed-piston type disk brake device 2*a* functioning as hydraulic service brake, thereby constituting the single opposed-piston type disk brake device 2*a*. Also, in the first embodiment, the clamp member 39 constituting the parking mechanism part 12 is supported in a state where it is superimposed (mounted) on the caliper 8 in the radial direction, and some (the tip ends and middle parts of the nut 46 and spindle 45) of the composing members of the thrust generation mechanism 40 constituting the parking mechanism part 12 are arranged within the enter-side inner cylinder 18.

Figure 15:
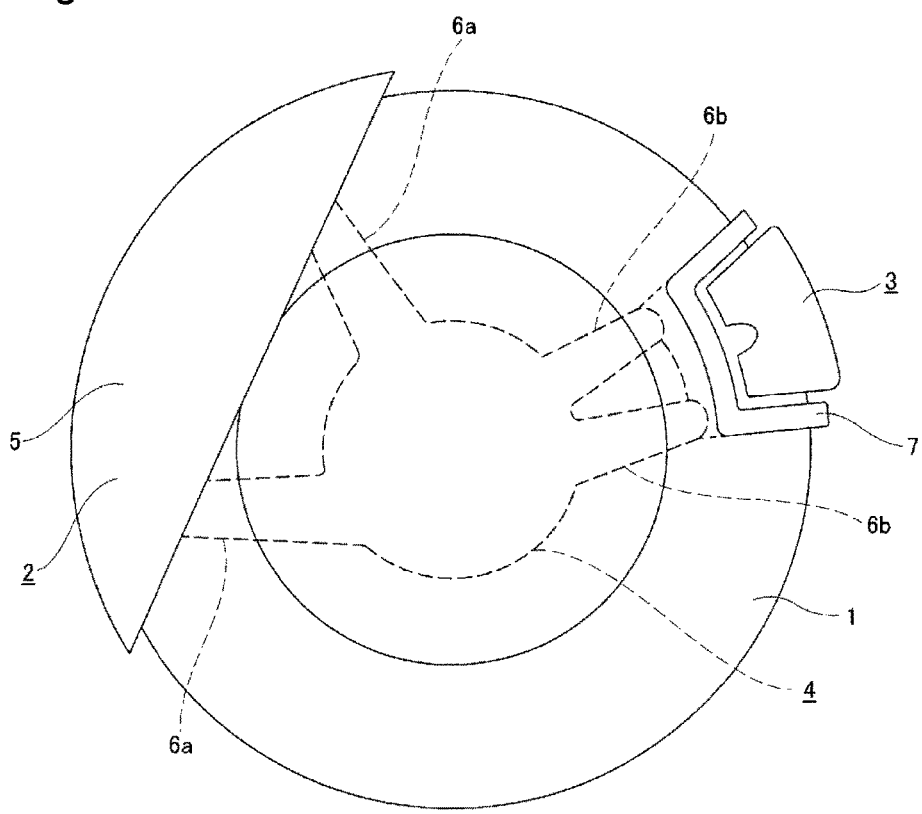
FIG. 15 is a typical view of a brake device having a conventional structure for fulfilling two functions of service brake and parking brake.

Therefore, when compared with a structure where two apparatuses respectively exclusively for service brake and for parking brake are arranged while they are spaced in the peripheral direction from each other, or a structure where these apparatuses are arranged continuously in the peripheral direction, for example, the conventional structure shown in FIG. 15, downsizing (particularly, relative to the structure where these apparatuses are arranged continuously in the peripheral direction, reduction of the whole length along the peripheral direction) and weight reduction of the whole apparatus can be realized. Further, in the first embodiment, since the pressure part 41 has a shape (a bifurcated shape) to straddle over the exclusively-for-service piston 11 fitted into the enter-side outer cylinder 18*a*, when compared with a structure where they are arranged adjacently in the peripheral direction, the whole length along the peripheral direction can be reduced effectively. Also, according to the structure of the first embodiment, the number of mounting parts necessary in the knuckle 4 can be reduced to only one that supports and fixes the caliper 8, thereby enabling enhancement in the degree of freedom in the shape of the knuckle 4. Further, since service brake and parking brake use the pair of outer pad 9*a* and inner pad 9*b* in common, the number of pads can be reduced (when compared with the structure of FIG. 15, two pads can be reduced), thereby also enabling realization of weight and cost reduction.

Second Embodiment

Figure 13:
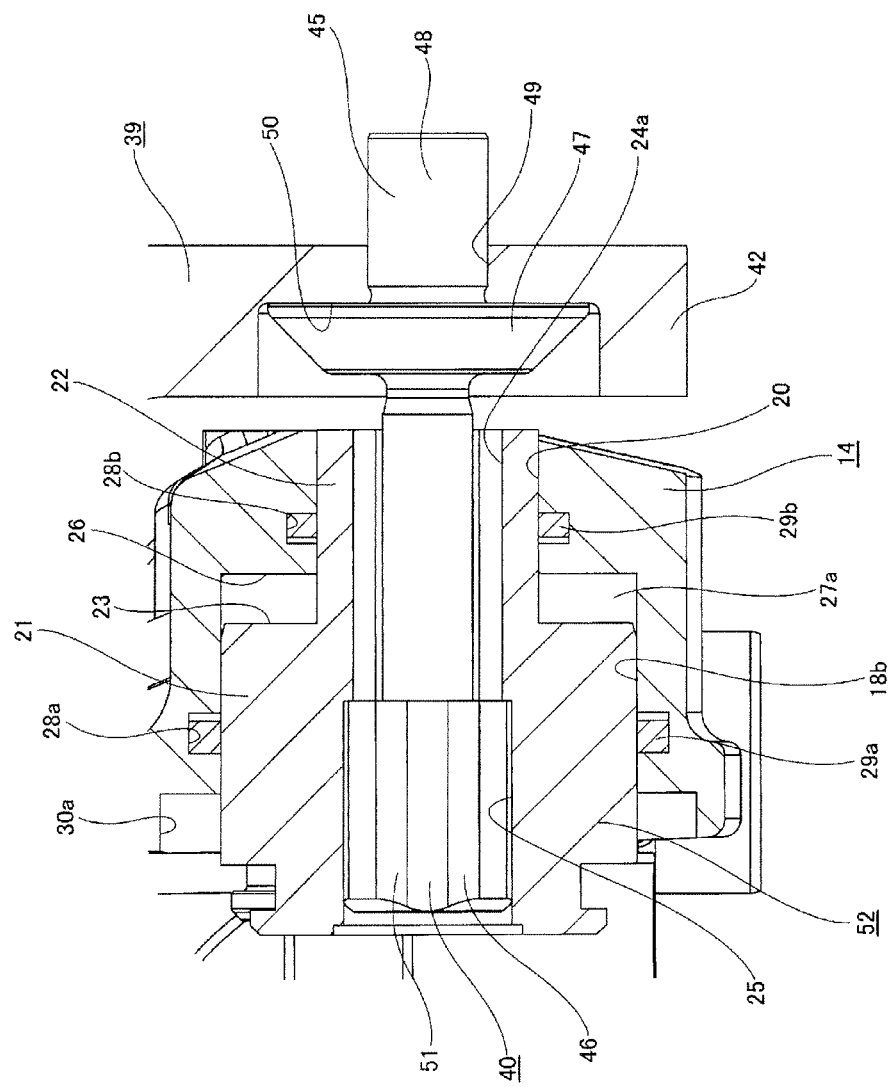
FIG. 13 is an enlarged view of the main parts of a second embodiment of the invention, corresponding to FIG. 8.

Description is given of a second embodiment of the invention with reference to FIG. 13. The second embodiment is characterized in that, as a piston to be fitted into the enter-side inner cylinder 18*b*, instead of the combined-use piston 10 (see FIGS. 7, 8 and so forth) used for both service brake and parking brake as in the first embodiment, there is employed an exclusively-for-service piston 52 which is used only for service brake. The exclusively-for-service piston 52, similarly to the combined-use piston 10, has on the inside thereof a storage hole 24*a* opened on the inner side. In this exclusively-for-service piston 52, however, the storage hole 24*a* is formed to penetrate through the tip end of the exclusively-for-service piston 52. The inside diameter of such portion of the storage hole 24*a* as penetrates through the tip end of the exclusively-for-service piston 52 has a size enabling the nut 46 constituting the thrust generation mechanism 40 to be inserted therethrough. Here, except for such penetration portion of the storage hole 24*a*, the exclusively-for-service piston 52 of the second embodiment is the same in structure as the previously-described combined-use piton 10.

In the thus structured second embodiment as well, to operate service brake, pressure oil is supplied into the liquid chambers 27*a* (27*b*) of the cylinders 18*b* (18*a*, 19*a*, 19*b*). Thus, a total of four exclusively-for-service pistons 52, (11) are pushed out from the cylinders 18*b* (18*a*, 19*a*, 19*b*) respectively, whereby the paired outer pad 9*a* and inner pad 9*b* (see FIGS. 6, 9 and so forth) are pressed against the opposite side surfaces of the rotor 1 (see FIG. 15).

Meanwhile, to operate parking brake, the spindle 45 constituting the thrust generation mechanism 40 is rotated to thereby move the nut 46 toward the outer side with respect to the inner body part 14. And, the tip end (outer side end) of the nut 46 is projected from the outer-side surface of the exclusively-for-service piston 52, whereby the inner pad 9*b* is pressed against the inner side surface of the rotor 1 directly by the nut 46. Also, a reacting force caused by such pressing is transmitted to the clamp member 39 through the contact portion between the flange part 47 and storage recess 50, whereby the clamp member 39 is moved toward the inner side with respect to the caliper 8 and the outer pad 9*a* is pressed against the outer-side surface of the rotor 1 by the pressure part 41 (see FIG. 7 and so forth).

In the above structured second embodiment, since the two ends of the storage hole 24*a* in the axial direction are open, workability of the storage hole 24*a* can be enhanced. Also, the efficiency of the operation to assemble some (such as the nut 46) of the composing parts of the thrust generation mechanism 40 into the storage hole 24*a* can also be enhanced.

Other structures and operation effects are similar to the previously-described first embodiment.

Third Embodiment

Figure 14:
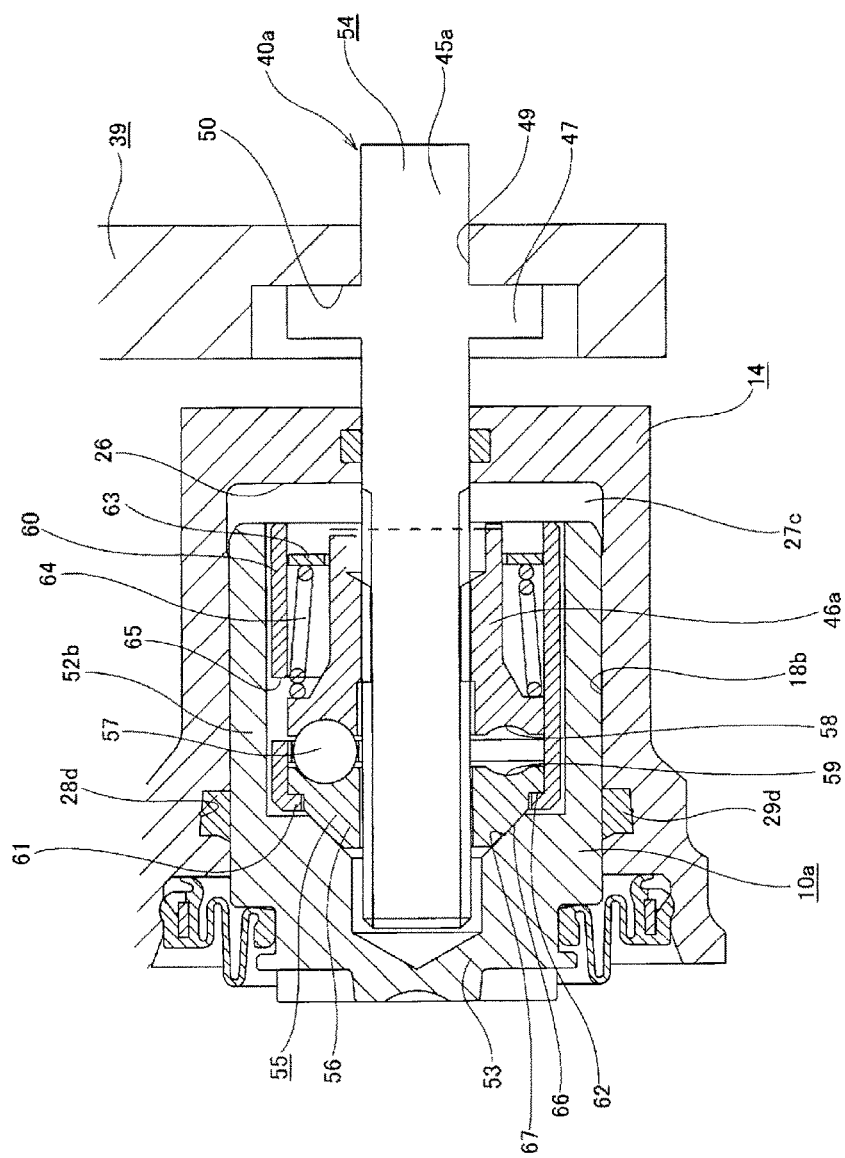
FIG. 14 is an enlarged view of the main parts of a third embodiment of the invention, corresponding to FIG. 8.

Description is given of a third embodiment of the invention with reference to FIG. 14. In the third embodiment, similarly to the first embodiment, a combined-use piton 10*a* is fitted in the enter-side inner cylinder 18*b*. The combined-use piton 10*a* has a bottomed cylindrical shape including a cylindrical part 52*b* and a bottom part 53 covering the outer side end of the cylindrical part 52*b*, whereas the shape of the outer peripheral surface thereof does not have such step as in the first embodiment. Also, in the third embodiment, a seal groove 28*d* is formed in only one location of the inner peripheral surface of the inner cylinder 18*b*, while a piston seal 29*d* is mounted in the seal groove 28*d*. And, between the bottom surface 26 of the enter-side inner cylinder 18*b* and the combined-use piston 10*a*, there is formed a liquid pressure chamber 27*c*.

Also, in the third embodiment, as a thrust generation mechanism 40*a*, there is used a combination of a feed screw mechanism 54 and a ball lamp mechanism 55. The feed screw mechanism 54 includes a spindle 45*a* and a nut 46*a* functioning as the drive side rotor of the ball lamp mechanism 55. The ball lamp mechanism 55 includes the nut 46*a*, a driven side rotor 56 and multiple balls 57. In the circumferential-direction multiple (for example, 3 to 4) locations of the mutually opposed surfaces of the nut 46*a* and driven side rotor 56, there are arranged drive side lamp parts 58 and driven side lamp parts 59 respectively having an arc shape when viewed in the axial direction. The depths of the drive side lamp parts 58 and driven side lamp parts 59 along the axial direction vary gradually along the circumferential direction, while the varying directions thereof are reversed between the drive side lamp parts 58 and driven side lamp parts 59. Therefore, when the nut 46*a* and driven side rotor 56 are rotated relatively and the balls 57 are rolled along the drive side lamp parts 58 and driven side lamp parts 59, a clearance between the nut 46*a* and driven side rotor 56 can be expanded (enlarged) by a great force.

The ball lamp mechanism 55 is arranged inside a case 60 internally fitted loosely on the inside diameter side of the combined-use piston 10*a*. In this state, a bent part 62 formed by bending one end (in FIG. 14, left end) of the case 60 inward in the radial direction is engaged with a locking step part 62 formed in the outer side end of the outer peripheral edge of the driven side rotor 56. Also, between the inner side surface of the tip end (in FIG. 14, left side end) of the nut 46*a* and a ring member 63 fixed to the near-to-inner side of the peripheral surface of the case 60, there is interposed an energization spring 64. The energization spring 64 applies to the nut 46a an elastic force in a direction opposite to the rotation direction of the nut 46 in operation (when braking force is generated) and an elastic force going toward the outer side.

Also, in a partial range (for example, an angular range of 120 to 180 degrees) of the middle part of the case 60 in the circumferential direction, there is formed a notch 65 penetrating from the outer peripheral surface of the case 60 to the inner peripheral surface thereof. And, a locking part (not shown) formed in a partial portion of the outer peripheral surface of the tip end of the nut 46a is engaged with the notch 65. Due to this structure, the nut 46a is prevented against excessive rotation (120 to 180 degrees or more).

Also, of the outer peripheral surface of the tip end of the driven side rotor 56, a rotor side inclined surface 66 projected to the outer side from the case 60 and inclined in a direction where the outside diameter thereof reduces toward the outer side is opposed to a partially conical concave-shaped receiving surface 67 formed in the inner side surface of the bottom part 53 of the combined-use piston 10a and is inclined in the same direction at the same angle as the rotor side inclined surface 66. And, a wedge effect provided by the rotor side inclined surface 66 and receiving surface 67 prevents the rotation of the driven side rotor 56.

In the above structured third embodiment as well, to operate service brake, pressure oil is supplied into the liquid pressure chambers 27c, (27b) of the cylinders 18b (18a, 19a, 19b) respectively. Thus, a total of four pistons 10a (one combined-use piston 10a and three exclusively-for-service pistons 11) are pushed out from the cylinders 18b (18a, 19a, 19b), whereby the paired outer pad 9a and inner pad 9b (see FIGS. 6, 9 and so forth) are respectively pressed against the opposite side surfaces of the rotor 1 (see FIG. 15).

Meanwhile, to operate parking brake, the spindle 45a constituting the feed screw mechanism 54 is rotated. In the early stage of this rotation, due to the friction resistance between the rotor side inclined surface 66 and receiving surface 67 and the resistance of the energization spring 64 and so forth, the nut 46a is prevented against rotation. And, due to threaded engagement between the male screw part of the spindle 45 and the female screw part of the nut 46a, the nut 46a together with the driven side rotor 56 is translated toward the tip end of the spindle 45a (is moved toward the rotor 1 without rotating). Due to this translation, the combined-use piston 10a is pushed out to the outer side to thereby press the inner pad 9b against the inner side surface of the rotor 1. Also, a reacting force caused by such pressing shifts the clamp member 39 to the inner side with respect to the caliper 8, whereby the outer pad 8a is pressed against the outer side surface of the rotor 1 by the pressure part 41 (see FIG. 7 and so forth). As a result, when clearances between the respective parts are lost and resistance against the further movements of the nut 46a and driven side rotor 56 toward the rotor 1 increases, the nut 46a is rotated together with the spindle 45a, whereby the nut 46a and driven side rotor 56 are rotated relative to each other. Accordingly, the balls 57, while rolling, are moved toward the shallower side of the drive side lamp part 58 and driven side lamp part 59, thereby spreading the clearance between the nut 46a and driven side rotor 56. Since the inclination angles of the drive side lamp part 58 and driven side lamp part 59 are gentle, a force for spreading the clearance between the nut 46a and driven side rotor 56 increases, whereby the inner pad 9b and outer pad 9a are pressed against the opposite side surfaces of the rotor 1 with a large force by the combined-use piston 10a and pressure part 41, thereby causing a braking operation.

Here, the structure and operation of the thrust generation mechanism 40a constituted of a combination of the feed screw mechanism 54 and ball lamp mechanism 55 are conventionally known widely, for example, by the disclosure of the patent document 3. Thus, further specific description thereof is omitted. Also, when enforcing the invention, the thrust generation mechanism can also employ, for example, a structure constituted of only a feed screw mechanism, and a structure constituted of a combination of a feed screw mechanism and a cam roller mechanism instead of a ball lamp mechanism.

Other structures and operation effects are similar to those of the first embodiment.

Here, the characteristics of the above-described embodiments of the opposed-piston type disk brake device of the invention are briefly summarized below.

[1] An opposed-piston type disk brake device (2a), comprising:
  the caliper (8) including
    the outer body part (13) and inner body part (14) which are arranged across the rotor (1) rotatable together with a wheel,
    the paired connecting parts (15a, 15b) connecting the peripheral-direction two ends of the outer body part (13) and inner body part (14) to each other at positions existing more outward in the radial direction than the outer peripheral edge of the rotor (1), and
    at least one set of cylinders (18a, 18b, 19a, 19b) respectively arranged in the outer body part (13) and inner body part (14) to be opposed to each other, the caliper (8) being fixed to a suspension device (knuckle 4) while straddling over the rotor (1);
  pistons (combined-use piston 10, exclusively-for-service pistons 11) respectively fitted liquid tight in the cylinders (18a, 18b, 19a, 19b) to be movable along the axial direction;
  at least paired pads (outer pad 9a, inner pad 9b) arranged on opposite sides of the rotor (1) and supported by the caliper (8) to be movable along the axial direction with respect to the caliper (8); and
  the parking mechanism part (12) including
    the clamp member (39) including the pressure part (41) in the outer side end thereof and the base part (42) in the inner side end thereof, interposed between the two connecting parts (15a, 15b) along the peripheral direction, supported by the caliper (8) to be movable in the axial direction with respect to the caliper (8) while straddling over from outward in the radial direction the pair of pads (outer pad 9a, inner pad 9b) and the inner body part (14) intervening between the pressure part (41) and base part (42) along the axial direction of the paired pads (outer pad 9a, inner pad 9b), and
  the thrust generation mechanism (40) including the member (spindle 45) supported on the base part (42) and movable toward the inner side with respect to the caliper (8) in operation and the member (nut 46) arranged in the inner body part (14) and movable toward the outer side in braking operation,
  wherein a braking force by service brake is generated when pressure oil is supplied into the cylinders (18a, 18b, 19a, 19b) and the pads (outer pad 9a, inner pad 9b) are pressed against the opposite side surfaces of the rotor (1) by the pistons (combined-use piston 10 and exclusively-for-service pistons 11), and
  wherein a braking force by parking brake is generated by that the inner side pad (inner pad 9b) of a pair of the pads (9a, 9b) over which the clamp member (39) straddles from outward in the radial direction is pressed against a side surface of the rotor (1) directly or indirectly by the member (nut 46) movable toward the outer side, and an outer side pad (outer pad 9a) of the pair of the pads (9a, 9b) is pressed by the pressure part (41) against a side surface of the rotor (1) when the clamp member (39) is moved toward the inner side with respect to the caliper (8) due to a reacting force caused by the pressing action of the inner side pad (9b), in accordance with operation of the thrust generation mechanism (40).

[2] The opposed-piston type disk brake device (2a) according to the above structure [1], wherein the member (nut 46) moving toward the outer side presses the inner side piston (combined-use piston 10) of the pistons which is fitted in the same cylinder (enter-side inner cylinder 18b) as the member (46) moving toward the outer side.

[3] The opposed-piston type disk brake device (2a) according to the above structure [1] or [2], wherein the inner side piston (combined-use piston 10) fitted in the same cylinder (enter-side inner cylinder 18b) as the member (46) moving toward the outer side has a stepped shape including an outer side large diameter part (21), an inner side small diameter part (22) and a step surface (23) formed continuously with the large and small diameter parts, and wherein the area of the step surface (23) is equal to the pressure receiving area (area of a bottom surface 33) of the outer side piston (exclusively-for-service piston 11) arranged opposed in the axial direction to the inner side piston (combined-use piston 10).

[4] The opposed-piston type disk brake device (2a) according to any one of the above structures [1] to [3], wherein the pressure part (41) is arranged to straddle over the outer side piston (exclusively-for-service piston 11).

[5] The opposed-piston type disk brake device (2a) according to any one of the above structures [1] to [4], wherein the thrust generation mechanism (40) includes a spindle (45) having a male screw part in the outer peripheral surface thereof and a nut (46) having a female screw part and screwed to the spindle (45).

[6] The opposed-piston type disk brake device (2a) according to any one of the above structures [1] to [5], wherein the thrust generation mechanism (40) is operated by an electric motor.

Here, the opposed-piston type disk brake device of the invention is not limited to the above embodiments but can be changed and improved properly. Also, the materials, shapes, number, arrangement locations and the like of the respective composing elements of the above embodiments are arbitrary and not limitative so long as they can attain the invention.

The application is based on the Japanese Patent Application (No. 2014-70987) filed on Mar. 31, 2014 and thus the contents thereof are incorporated herein by way of reference.

INDUSTRIAL APPLICABILITY

In the above embodiments, description has been given only of the structure that can be provided using the electric drive device but the invention is not limited to such structure. That is, a drive structure using a parking lever such as the structure disclosed in the patent document 4 can also be employed so long as a braking force by parking brake can be generated by driving a parking mechanism part. Also, the number of pads to be used is not limited to two but four or six pads can also be used.

REFERENCE SIGNS LIST

1: Rotor
2, 2a: Opposed-piston type disk brake device
3: Floating type disk brake device
4: Knuckle (suspension device)
5: Caliper
6a, 6b: Mounting part
7: Support
8: Caliper
9a: Outer pad (pad)
9b: Inner pad (pad)
10, 10a: Combined-use piston (piston)
11: Exclusively-for-service piston (piston)
12: Parking mechanism part
13: Outer body part
14: Inner body part
15a, 15b: Connecting part
10: Middle connecting part
17a, 17b: Mounting seat
18a: Enter-side outer cylinder (cylinder)
18b: Enter-side inner cylinder (cylinder)
19a: Exit-side outer cylinder (cylinder)
19b: Exit-side inner cylinder (cylinder)
20: Communication hole
21: Large diameter part
22: Small diameter part
23: Step surface
24: Storage hole
25: Female spline section
26: Bottom surface
27a, 27b, 27c: Liquid pressure chamber
28a, 28b, 28c, 28d: Seal groove
29a, 29b, 98c, 29d: Piston seal
30a, 30b: Large diameter groove
31: Piston main body
32: Pressure part
33: Bottom surface
34a, 34b: Guide wall section
35a, 35b: Guide recessed groove
36: Lining
37: Back plate
38a, 38b: Ear section
39: Clamp member
40, 40a: Thrust generation mechanism
41: Pressure part
42: Base part
43: Bridge part
44a, 44b: Guide pin
45: Spindle (member moving toward inner side)
45a: Spindle
46: Nut (member moving toward outer side)
47: Flange part
48: Base end
49: Support hole
50: Storage recess
51: Male spline section
52b: Cylindrical part
53: Bottom part
54: Feed screw mechanism
55: Ball lamp mechanism
56: Driven side rotor
57: Ball
58: Drive side lamp part
59: Driven side lamp part
60: Case
61: Bent part
62: Locking step part
63: Ring member
64: Energization spring
65: Notch 66: Rotor side inclined surface
67: Receiving surface

The invention claimed is:

1. An opposed-piston disk brake device, comprising:
a caliper including
an outer body part and an inner body part which are arranged across a rotor rotatable together with a wheel,
a pair of connecting parts connecting together peripheral-direction two ends of the outer body part and inner body part at a position existing more outward in a radial direction than an outer peripheral edge of the rotor, and
at least one set of cylinders respectively arranged in the outer body part and inner body part to be opposed to each other, the caliper being fixed to a suspension device while straddling over the rotor;
pistons respectively fitted in the cylinders to be liquid-tight and movable along the axial direction;
at least a pair of pads respectively arranged on opposite sides of the rotor and supported by the caliper to be movable along an axial direction with respect to the caliper; and
a parking mechanism part including
a clamp member including a pressure part in an outer side end thereof and a base part in an inner side end thereof, interposed between the connecting parts along a peripheral direction, supported by the caliper to be movable in the axial direction with respect to the caliper while straddling from outward in the radial direction over the pair of pads and the inner body part respectively intervening between the pressure part and the base part along the axial direction of the pads, and
a thrust generation mechanism including a member supported on the base part and movable toward the inner side with respect to the caliper when a parking brake is operated and a member arranged in the cylinders provided in the inner body part and movable toward the outer side when the parking brake is operated,
wherein a braking force by a service brake is generated when pressure oil is supplied into the cylinders and the pads are pressed against opposite side surfaces of the rotor by the pistons,
wherein a braking force by the parking brake is generated by that an inner side pad of a pair of the pads over which the clamp member straddles from outward in the radial direction is pressed against a side surface of the rotor directly or indirectly by the member movable toward the outer side, and an outer side pad of the pair of the pads is pressed by the pressure part against a side surface of the rotor when the clamp member is moved toward the inner side with respect to the caliper due to a reacting force caused by the pressing action of the inner side pad, in accordance with operation of the thrust generation mechanism,
wherein an inner side piston of the pistons which is fitted in a same cylinder as the member moving toward the outer side has a stepped shape including an outer side large diameter part, an inner side small diameter part and a step surface formed continuously with the large and small diameter parts and configured to receive a pressure of the pressure oil, and
wherein a pressure receiving area of the step surface is equal to a pressure receiving area of an outer side piston of the pistons which is arranged opposed in the axial direction to the inner side piston.

2. The opposed-piston disk brake device according to claim 1,
wherein the member moving toward the outer side presses the inner side piston of the piston which is fitted in the same cylinder as the member moving toward the outer side.

3. The opposed-piston disk brake device according to claim 1,
wherein the pressure part is arranged to straddle over the outer side piston.

4. The opposed-piston disk brake device according to claim 1,
wherein the thrust generation mechanism includes a spindle having a male screw part in an outer peripheral surface thereof and a nut having a female screw part in an inner peripheral surface thereof and screwed to the spindle.

5. The opposed-piston disk brake device according to claim 1,
wherein the thrust generation mechanism is operated by an electric motor.

* * * * *